Patented May 26, 1953

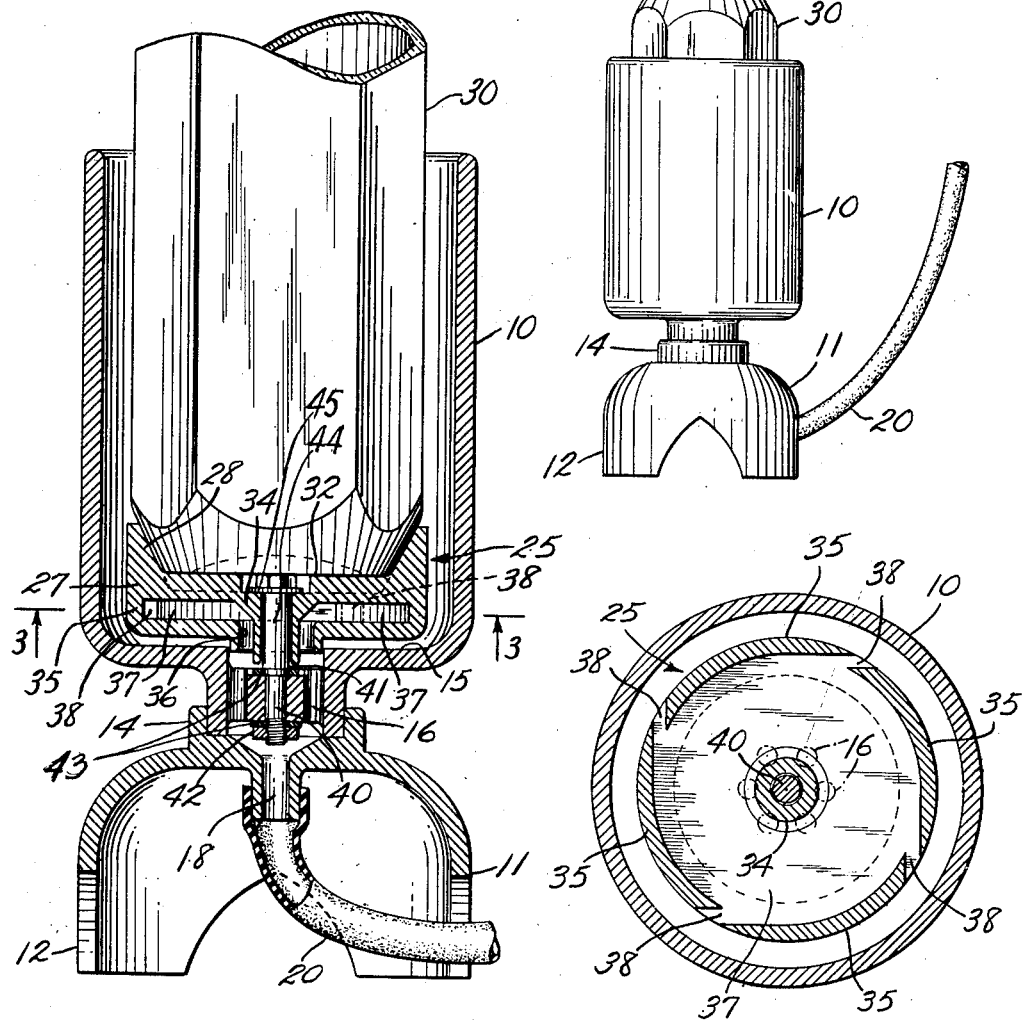

2,639,897

UNITED STATES PATENT OFFICE 2,639,897

VESSEL WITH TURBINE FOR ROTATING CONTAINER WHILE HEATING OR COOLING

John B. Prather, Yonkers, N. Y.

Application November 15, 1949, Serial No. 127,319

11 Claims. (Cl. 257—74)

1

This invention relates to apparatus for heating or cooling containers, such as babies' nursing bottles, by contact of the container with a moving mass of water; and the invention relates more particularly to improved apparatus for increasing the rate of heat transfer by relative movement of the container and the liquid.

It is an object of the invention to provide an improved apparatus for heating or cooling a container by rotating the container in a bath of hot or cold water. The invention is constructed in such a way that friction is reduced to a minimum and the container can be rotated by water at low pressure and without heavy flow. In the preferred embodiment of the invention, a swirling movement is imparted to the water in a direction counter to the direction of rotation of the container.

A movement of the water over the surface of the container with sufficient velocity to prevent the formation of stationary boundary layers is effectively accomplished by applying rotating force to the container itself. In this way the same movement is imparted to the upper part of a container as to the lower part, whereas swirling movement imparted only to the water loses its velocity as it moves away from the water inlet and this would make the relative movement of the water and container less toward the top of the container.

Other objects, features and advantages of the invention will appear or be pointed out as the description proceeds.

In the drawing, forming a part hereof, in which like reference characters indicate corresponding parts in all the views, Figure 1 is a side elevation of a bottle warmer made in accordance with this invention, Figure 2 is a greatly enlarged sectional view taken on a diameter of the bottle warmer shown in Figure 1, Figure 3 is a sectional view taken on the line 3—3 of Figure 2.

The apparatus comprises a vessel 10 secured to a base 11 having legs 12 for supporting the apparatus on the bottom of a sink or other surface. In the construction illustrated, the vessel 10 is a one-piece plastic molding; and the base 11 is a one-piece plastic molding with an annular rim that surrounds a recess which is engaged by the lower end of the vessel 10. The base 11 is bonded to the vessel 10, preferably by adhesive, along the confronting faces of base and vessel.

The upper end of the vessel 10 is open and

2 when the apparatus is in use, water travels upwardly in the vessel and flows over the edge around the top opening. If the apparatus is placed in a sink, wash basin or bath tub while in use, the overflowing water runs to the drain. When a drained support is not conveniently available, the apparatus can be used in a large kettle with sufficient capacity to hold the amount of water that will overflow from the vessel 10 while the apparatus is being operated.

The vessel 10 has a bottom 15 that merges with the sides of the vessel at a corner which is rounded so as to provide a guiding surface of fair form for water passing outwardly across the bottom 15. Water enters the vessel 10 through passages 16 located at angularly spaced regions around a circle which has its center at the center of the bottom 15. All of the passages 16 communicate with a common water inlet 18 that diverges toward its upper end to provide a chamber with which all of the passages 16 communicate.

A hose 20 connects with the inlet 18. The other end of the hose 20 is connected with a hot or cold water faucet for supplying water to the apparatus. The hose passes through the space between successive legs of the base 11.

There is a rotary element 25 in the lower end of the vessel 10. This rotary element comprises a water turbine rotor 27 and a holder 28 on top of the turbine rotor in position to support a container 30, the container illustrated being a nursing bottle. The holder 28 has a frusto conical surface for centering the container 30 and has inwardly extending ribs 32 for supporting containers of smaller diameter. Other shapes for the holder 28 or adapters for accommodating the holder to containers of different shape can be used.

The turbine rotor 27 includes a center hub 34 and an outer rim 35 that extends downwardly and inwardly to an inner rim 36 which is spaced from the center hub to provide an annular passage through which water enters a pressure chamber 37 of the turbine rotor. Passages 38 extend through the outer rim 35 in directions substantially tangent to the outer wall of the pressure chamber 37, and these passages 38 are the nozzles of the turbine rotor 27.

The annular recess between the inner rim 36 and the center hub 34 is located immediately above the water inlet passages 16, and there is a counterbore in the bottom of the vessel 10 at the upper ends of the water passages 16. The inner rim 36 of the turbne rotor extends down into this counterbore. The outside surface of the rim 36 has a running clearance in the counterbore and serves as the seal for preventing water from passing upwardly through the passages 16 and outward across the bottom of the vessel 10 under the turbine rotor. The counterbore in which the rim 36 runs is deep enough to permit the rim to shift up and down, within the range of vertical movement of the turbine rotor, without withdrawing the inner rim 36 from the counterbore.

A stud comprising a screw 40 extends through an opening in the center of the bottom 15 and has a shoulder 41 which limits the downward movement of the screw 40. A nut 42 threads over the lower end of the screw 40 and holds the screw secured to the bottom of the vessel. There are washers 43 or gaskets under the shoulder 41 and nut 42. The screw 40 has a smooth cylindrical portion 44 extending upwardly from the shoulder 41 to a shallow head at the top of the screw 40. This cylindrical portion of the screw 40 extends through a center opening of the turbine rotor, and comprises a bearing on which the turbine rotor turns. This bearing takes any radial loading of the turbine rotor 25.

The length of the screw 40 above the shoulder 41 is only slightly greater than the length of the center opening in the turbine rotor hub through which the screw 40 extends. A thrust bearing 45 at the top of the turbine rotor is pressed against the underside of the head of the screw 40 to provide a thrust bearing for the rotor element 25 when the apparatus is in operation. The lower end face of the hub 34 rests on the upper washer 43, which serves as a thrust bearing, to support the rotor when the upward force of the water is insufficient to lift the rotor 25 and the container 30.

When water flows into the vessel 10, through the inlet passages 16, the upward force of the water lifts the turbine rotor until it is in contact with the thrust bearing provided at the upper end of the screw 40. Thus the turbine rotor and container are literally floating on the water so that friction is reduced to a minimum when the apparatus is in operation.

Water discharging through the nozzles 38 in Figure 3 exerts a thrust which turns the turbine rotor counterclockwise, but the water exhausted from the turbine rotor has a clockwise swirling movement. As the water moves upwardly as a swirling helix, therefore, the turbine turns the container 30 in a direction opposite to the direction of rotation of the water, and the relative velocity of the water and the sides of the container are thus increased to a value equal to the sum of the separate lineal velocities of the water and container wall. This increases the rate of heat transfer between the water and the container by preventing the formation of stationary or substantially stationary boundary layers of water in contact with the outside surface of the container. The time required to heat the bottle is very much reduced by this intimate contact of the bottle wall with the constantly circulating water.

The preferred embodiment of the invention has been illustrated and described, but changes and modifications can be made and some features of the invention can be used alone or in different combinations without departing from the invention as defined in the claims.

I claim as my invention:

1. Apparatus for transferring heat between a container and a water bath, said apparatus including a vessel adapted to hold water, a rotary element supported by a thrust bearing at the bottom of the vessel and adapted to support the container in the vessel, the rotary element being of limited extent that leaves the container in contact with the water in said vessel, and a radial load bearing located at the lower end of the vessel and on which the rotary element turns and is slidable upwardly, said vessel having a water inlet located under the rotary element and in a position to direct the entering stream of water against the underside of the rotary element to urge the rotary element upwardly and thus reduce the load and friction on said thrust bearing, the rotary element having reaction surfaces exposed to the water flowing through said inlet and directed to discharge the water outwardly in the vessel and toward the side of the vessel.

2. Heat transfer apparatus including a vessel adapted to hold water having a water inlet opening at its lower end disposed to direct an incoming stream of water upward in the vessel, a water turbine rotor located in the vessel above the inlet opening and in the path of the water stream, a holder on the top of the turbine rotor for supporting a container that is to be heated or cooled by the water in the vessel, bearings at the bottom of the vessel and on which the radial loading and the weight of the turbine rotor and container are carried when there is no water stream from the inlet, the holder being slidable upwardly on one of said bearings, a thrust bearing in position to limit upward movement of the turbine when it is lifted by upward thrust of the water stream coming through the inlet, and reaction nozzles on the turbine rotor directing exhaust water from the turbine outwardly toward the sides of the vessel.

3. Heat transfer apparatus including a vessel adapted to hold water and having a water inlet at its lower end and a water overflow outlet at its upper end, a holder rotatably mounted on bearings at the bottom of the vessel, including a radial load bearing and including also a thrust bearing for supporting a container that is to be heated or cooled by the water in the vessel, said holder being movable upwardly on the radial load bearing, and being of limited extent that leaves the container, when seated in the holder, in contact with the water in the vessel, a water turbine rotor connected to the holder and located under said holder and above the water inlet, said turbine rotor having a surface above said inlet and that is thrust upwardly by the stream of water from the inlet to lift the weight of the holder and container from the bearing, and said turbine rotor having reaction nozzles disposed to direct exhausted water toward the sides of the vessel.

4. Heat transfer apparatus including a vessel adapted to hold water and having a water inlet at its lower end and a water overflow outlet at its upper end, a holder rotatably mounted on bearings at the bottom of the vessel, including a radial load bearing and including also a thrust bearing for supporting a container that is to be heated or cooled by the water in the vessel, said holder being movable upwardly on the radial load bearing and being of limited extent that leaves the container, when seated in the holder, in contact with the water in the vessel, a water turbine rotor connected to the holder and located under said holder and having a pressure chamber into which water flows upwardly from said inlet to thrust the turbine rotor upward to relieve the thrust bearing of the weight of the turbine rotor, holder and the container, when seated in the holder said turbine rotor having reaction nozzles through which water flows from the pressure chamber into the vessel beyond the turbine rotor, and a second thrust bearing in position to limit movement of the turbine rotor away from the bottom of the vessel.

5. The heat transfer apparatus described in claim 4 in which the turbine rotor turns about a radial load bearing that is centrally located at the bottom of the vessel, and the water inlet at the bottom of the vessel includes a plurality of passages opening upwardly through the bottom of the vessel and spaced angularly around said bearing.

6. Apparatus for heating or cooling a container by rotating it in a water bath, said apparatus including a vessel adapted to hold water, a bearing in the vessel at its lower end, said vessel having a bottom with a plurality of water inlet passages opening through the bottom at angularly spaced regions around the bearing, a water turbine rotor that turns on the bearing, a holder supported by the rotor for holding the container, the turbine rotor having an annular water inlet in its bottom surface directly over the inlet passages and having a pressure chamber for water and reaction nozzles opening from the pressure chamber outwardly through the periphery of the rotor, and a circular rim on the bottom of the turbine rotor extending into a recess in the bottom of the vessel and sealing the turbine rotor to prevent substantial leakage of water inlet passages across the vessel under the rotor.

7. A heat transfer apparatus including a vessel adapted to hold water and having a bottom and a water inlet near the center of the bottom, a water turbine rotor located in the vessel immediately above the water inlet and having a plurality of reaction nozzle with their discharge ends angularly spaced around the periphery of the turbine rotor so as to exert a substantially balanced thrust, said exhaust outlets being directed outwardly toward the sides of the vessel, and a container holder on top of the turbine rotor, the container holder being of limited extent that leaves a container thereon in contact with the water in said vessel.

8. A heat transfer apparatus including a vessel adapted to hold water and a rotary element in the vessel on which is supported a container to or from which heat is to be transferred, an inlet at the bottom of the vessel through which water is introduced into the vessel, a reaction turbine rotor above the water inlet and forming a part of said rotary element, said turbine rotor having exhaust outlets at different regions around the side of the vessel for distributing the water substantially evenly around the lower end of the side as the rotor turns.

9. Heat transfer apparatus including a vessel adapted to hold water and having an opening at its upper end for the overflow of water from the vessel, and having a water inlet at its lower end, a rotary element in the lower end of the vessel, a turbine rotor on the rotary element and located above the water inlet, a holder on the rotary element for supporting a container which turns as a unit with said rotary element, the turbine rotor having exhaust passages directed at angles to the radii of the rotary element and extending in directions to impart a swirling movement to the water in the vessel with the rotary component of motion of the water opposite to the direction of rotation of the container so as to increase the effective velocity of the water across the sides of the container and thereby facilitate transfer of heat between the water and the container.

10. Apparatus for transferring heat between a container and a water bath, said apparatus including a base with a water inlet, a connection at one end of the water inlet for holding a hose, a vessel mounted on and rigidly connected with the base, said vessel being adapted to hold water and having one or more water inlet passages communicating with the water inlet in the base, a center stud extending through the bottom of the vessel, a turbine rotor connected to the stud and rotatable about the axis of the stud, said turbine rotor being located above the water inlet, a holder connected with the turbine rotor and located above the turbine rotor in position to support a container in the vessel, said holder having a clearance between it and the sides of the vessel for the passage of water upwardly along the sides of the vessel and into contact with a container supported by the holder.

11. Apparatus for transferring heat between a container and a water bath, said apparatus including a vessel that is adapted to hold water and that has an opening at its upper end for the overflow of water, and that has a plurality of water inlets opening through its bottom at angularly spaced regions around the center of the bottom, a rotary element in the vessel, a center stud extending downwardly through a hub in the rotary element and into the bottom of the vessel, a thrust bearing at the upper end of the stud in position to limit upward movement of the rotor, a turbine rotor on the rotary element with a pressure chamber in the turbine rotor above the water inlet passages and with turbine nozzles leading outwardly from the pressure chamber at angles which impart a swirling movement to the water exhausted from the turbine rotor, a holder on top of the rotary element centering and supporting a container that is to be turned as a unit with the turbine rotor, said holder having its surface shaped to fit the bottom of the container with which the apparatus is intended to be used and said holder having a center substantially on the axis of the vessel.

JOHN B. PRATHER.

References Cited in the file of this patent

UNITED STATES PATENTS

| Number | Name | Date |
| --- | --- | --- |
| 442,461 | Sharples et al. | Dec. 9, 1890 |
| 590,247 | Valley | Sept. 21, 1897 |
| 649,292 | Forsythe et al. | May 8, 1900 |

FOREIGN PATENTS

| Number | Country | Date |
| --- | --- | --- |
| 45,002 | Germany | Oct. 30, 1888 |